(12) United States Patent
Hitomi

(10) Patent No.: US 11,592,536 B2
(45) Date of Patent: Feb. 28, 2023

(54) CONTROL OF IMAGE CAPTURE

(71) Applicant: Sony Semiconductor Solutions Corporation, Kanagawa (JP)

(72) Inventor: Yasunobu Hitomi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1024 days.

(21) Appl. No.: 16/244,276

(22) Filed: Jan. 10, 2019

(65) Prior Publication Data

US 2019/0227174 A1     Jul. 25, 2019

(30) Foreign Application Priority Data

Jan. 10, 2018   (EP) .................................. 18151026

(51) Int. Cl.
*G01S 7/48*     (2006.01)
*G01S 7/4863*   (2020.01)
(Continued)

(52) U.S. Cl.
CPC .......... *G01S 7/4863* (2013.01); *G01S 7/4865* (2013.01); *G01S 17/08* (2013.01); *G01S 17/89* (2013.01)

(58) Field of Classification Search
USPC ....................................................... 356/5.01
See application file for complete search history.

(56) References Cited

U.S. PATENT DOCUMENTS 7,546,951 B2   6/2009  Kotlarsky et al.
9,794,529 B2  10/2017  Lee et al.
(Continued)

FOREIGN PATENT DOCUMENTS

EP          2 894 492 A1      7/2015
WO    WO-2008131313 A2 *  10/2008  ............. B82Y 20/00

OTHER PUBLICATIONS

[No. Author Listed], Introduction to the Time-of-Flight (ToF) System Design, Literature No. SAU219D. Texas Instruments. Dec. 2013. Revised May 2014. 32 pages.

(Continued)

*Primary Examiner* — James R Hulka
(74) *Attorney, Agent, or Firm* — Wolf, Greenfield & Sacks, P.C.

(57) ABSTRACT

Exposure control apparatus to control an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern having a respective phase relationship with the pulsed illumination of the illumination source comprises a detector configured to detect, for a selected tap value of a set of one or more target pixels, a portion of that tap value which is independent of the integration period and a portion which is dependent upon the integration period; and a controller configured to select a next integration period for the image capture sensor so that for a next pixel integration of the set of one or more target pixel values, the portion of the largest tap value which is dependent upon the increased integration period is substantially equal to the difference between the required tap value and the portion which is independent of integration period.

14 Claims, 12 Drawing Sheets

(51) Int. Cl.
  *G01S 17/89*   (2020.01)
  *G01S 17/08*   (2006.01)
  *G01S 7/4865*  (2020.01)

(56) References Cited

U.S. PATENT DOCUMENTS

| | | | |
|---|---|---|---|
| 9,800,795 B2 | 10/2017 | Zabatani et al. | |
| 2005/0017488 A1* | 1/2005 | Breed | B60R 21/01536 |
| | | | 280/735 |
| 2011/0309236 A1* | 12/2011 | Tian | H01L 27/14638 |
| | | | 257/E31.097 |
| 2014/0027606 A1* | 1/2014 | Raynor | G06F 3/017 |
| | | | 250/208.1 |
| 2016/0109575 A1* | 4/2016 | Oggier | G01S 7/4915 |
| | | | 356/51 |
| 2016/0267806 A1* | 9/2016 | Hsu | G09B 19/00 |
| 2019/0166355 A1* | 5/2019 | Banks | H04N 13/254 |

OTHER PUBLICATIONS

Li, Time-of-Flight Camera—An Introduction. Texas Instruments. Jan. 2014. Revised May 2014. 10 pages.

Stoppa et al., Time of Flight Image Sensors in 0.18 μm CMOS Technology: a Comparative Overview of Different Approaches. 2011. 4 pages.

* cited by examiner $$AC_{contrast} = \frac{2(|I| + |Q|)}{Total\ signal}$$

$$= \frac{2\Sigma|dm|}{\Sigma|dm| + 2\Sigma cm_{active}}$$

CONTROL OF IMAGE CAPTURE

CROSS REFERENCE TO RELATED APPLICATIONS

The present application claims priority to European Patent Application 18151026.4 filed by the European Patent Office on Jan. 10, 2018, the entire contents of which being incorporated herein by reference.

BACKGROUND

Field of the Disclosure

This disclosure relates to the control of image capture.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

It is known to generate three-dimensional images using a so-called time-of-flight (TOF) image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern and having a respective phase relationship with the pulsed illumination of the illumination source.

The exposure of such an image sensor can be controlled by varying the integration period, which is the period of time during which pixel sensors are allowed to acquire light before the pixel values are read out from the sensor.

Exposure control is a somewhat different issue in TOF sensors to "normal" image sensors producing an image such as a photograph to be viewed by a user. In a photographic sensor, the aim of exposure control is generally to produce a resulting image with better perception and sufficiently good contrast. For a TOF sensor, the aim of exposure control is generally to achieve a better signal to noise ratio (SNR) without excessive pixel saturation.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides exposure control apparatus to control an integration period of a time-of-flight image capture sensor comprising an illumination source providing pulsed illumination at a pulse repetition frequency, in which each pixel of an array of pixels is represented by multiple pairs of tap values, each pair of tap being indicative of light sampled according to a pulsed sampling pattern and having a respective phase relationship with the pulsed illumination of the illumination source, the exposure control apparatus comprising:

a detector configured to detect, for a selected tap value of a set of one or more target pixels, a portion of that tap value which is independent of the integration period and a portion which is dependent upon the integration period; and a controller configured to select a next integration period for the image capture sensor so that for a next pixel integration of the set of one or more target pixel values, the portion of the largest tap value which is dependent upon the next integration period is substantially equal to the difference between the required tap value and the portion which is independent of the integration period.

Another example embodiment provides image sensing apparatus comprising: a time-of-flight image capture sensor; and exposure control apparatus as defined above, configured to control an integration period of the image capture sensor.

Another example embodiment provides a method of controlling an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern and having a respective phase relationship with the pulsed illumination of the illumination source, the method comprising:

detecting, for a selected tap value of a set of one or more target pixels, a portion of that tap value which is independent of the integration period and a portion which is dependent upon the integration period; and selecting a next integration period for the image capture sensor so that for a next pixel integration of the set of one or more target pixel values, the portion of the largest tap value which is dependent upon the increased integration period is substantially equal to the difference between the required tap value and the portion which is independent of integration period.

Example embodiments provide computer software which, when executed by a computer, causes the computer to perform the above method, and a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE EMBODIMENTS

Figure 1:
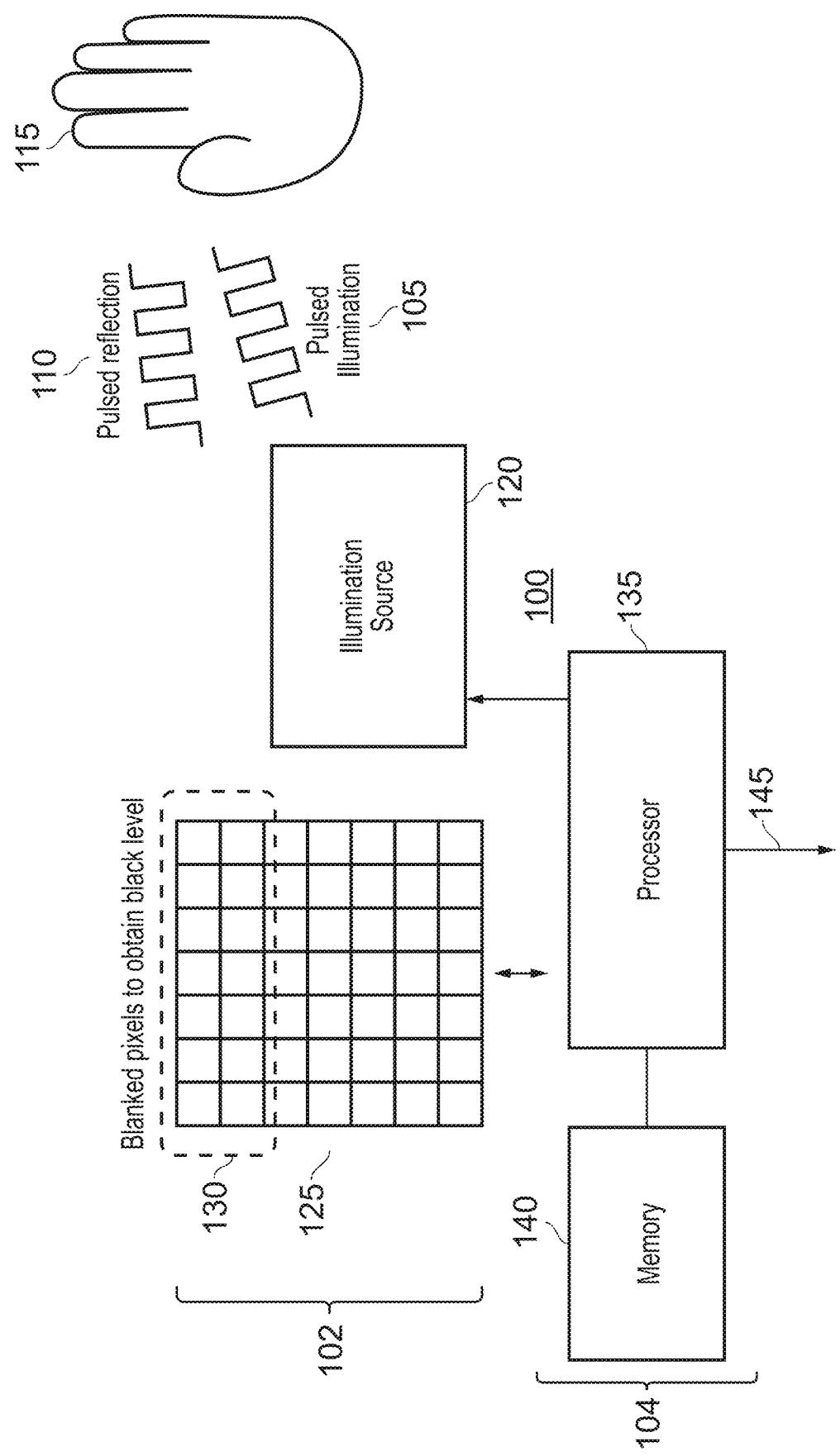
FIG. 1 schematically illustrates an image capture apparatus.

FIG. 1 schematically illustrates an image capture apparatus 100, and in particular a so-called time-of-flight (TOF) image capture sensor 102 and associated control electronics 104 acting as exposure control apparatus configured to control an integration period of the image capture sensor.

A TOF camera operates by providing pulsed or modulated illumination 105 and then detecting the reflected light 110 from a scene or object 115. A depth separation between the sensor and the object 115 can be detected by observing a phase shift between the illumination 105 and the reflection 110.

In FIG. 1, the illumination is provided by an illumination source 120 which provides the pulsed illumination 105 at a pulse repetition frequency of for example 40 MHz. An image is detected by an array 125 of pixel elements.

As discussed in more detail below, a subset 130 of one or more of the pixels (for example one or two lines of pixels in the array) is blanked from incident light. This way, the subset 130 can be used to detect a so-called dark offset, or in other words an output from the image capture sensor which is entirely independent of the reflected light 110 and also any ambient light incident upon the pixel array.

This provides an example in which a detector discussed below is configured to detect a dark offset value as at least a part of the portion independent of the integration period, by detecting the output of one or more pixels of the image capture sensor shielded from incident light.

Operation of the image capture sensor, including the setting of parameters such as an exposure or integration period and also deriving a three dimensional image from the data captured by the image capture sensor is handled by a processor 135 such as a programmable processor operating under the control of computer software stored in a memory 140. In this regard, the memory 140 can provide an example of a machine-readable non-transitory storage medium which stores computer software by which the processor 135 performs the functionality to be discussed below. Examples of such a memory include a read only memory (ROM) or a flash memory.

An output of the apparatus 100 of FIG. 1 is a three-dimensional image or a series of such images, provided in an appropriate known format for such images as an output signal 145.

Figure 2A:
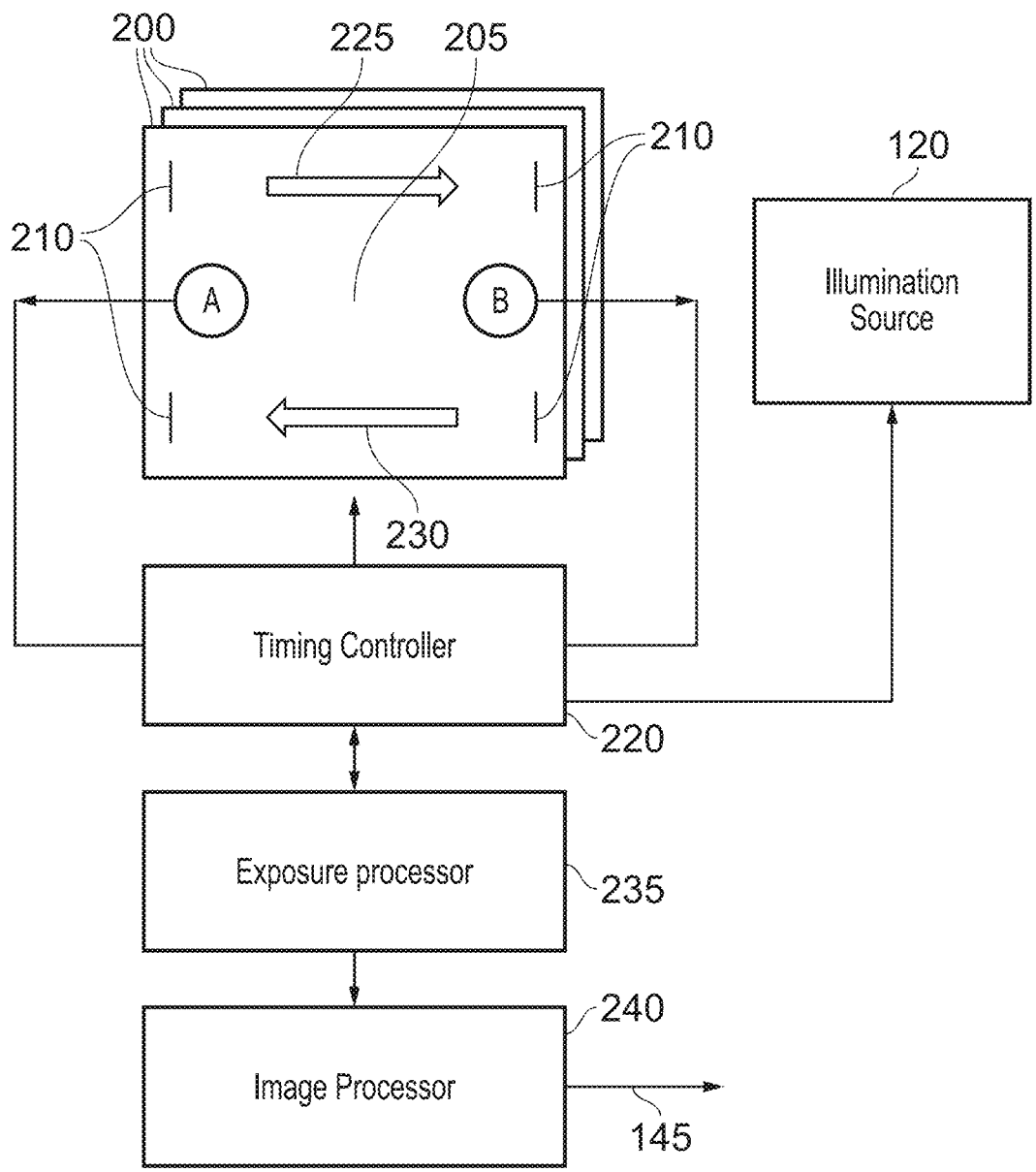
FIGS. 2a and 2b provide a more detailed representation of the apparatus of FIG. 1.

FIG. 2a is a more detailed representation of the apparatus of FIG. 1. Once again, the illumination source 120 provides pulsed illumination as discussed above. In FIG. 2a, individual pixel elements 200 of the array 125 of pixel elements are shown. Each pixel element comprises a region 205 upon which incident light (representing ambient light plus the pulsed illumination from the illumination source, as reflected by the scene or object under observation), is detected and gives rise to an accumulation of electrical charges in a substrate material.

Electrodes 210 provide an electric field across the region 205 which is reversible under control of a timing controller 220.

Two so-called taps, tap "A" and tap "B" provide outputs from the pixel element 200. When the electric field provided by the electrodes 210 is in a first direction, the accumulated charges in the region 205 will tend to move in a first charge movement direction 225 towards the tap B. When the electrical field provided by the electrodes 210 is in the other direction, the accumulated charges will tend to move in the other direction 230 towards the tap A.

The timing controller 220 controls the timing of the changes in the electric field provided by the electrodes 210 and also the timing of the illumination by the illumination source 120.

The description just provided relates to a so-called Current Assisted Photonic Demodulator (CAPD) type of pixel architecture. Other example architectures such as so-called buried channel photonic demodulators exist and may be used with the present techniques. Examples are discussed in Stoppa et al, "Time Of Flight Image Sensors in 0.18 µm CMOS Technology: a Comparative Overview of Different Approaches", the contents of which are incorporated in the present description by reference.

An exposure processor 235 controls the overall integration period of the sensor. The integration period may be considered as analogous to an exposure period, but as a single image is derived from multiple instances of illumination and detection, the meaning of the integration period will be discussed further below.

An image processor 240 operates on the signals derived from the taps A, B of each pixel element 200 of the array of pixel elements to generate the output signal 145. The timing controller, exposure processor and image processor may be implemented by the processor 135 of FIG. 1 operating under the control of program instructions stored in the memory 140.

Figure 2B:
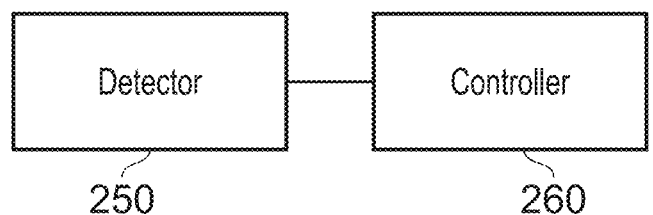

The exposure processor 235 provides, with reference to FIG. 2b, an example of a detector 250 configured to detect, for a largest tap value (to be discussed below) of a set of one or more target pixels, a portion of that tap value which is independent of the integration period and a portion which is dependent upon the integration period. The timing controller 220 and the exposure processor 235, operating together, provide an example of a controller 260 configured to select a next integration period for the image capture sensor so that for a next pixel integration of the set of one or more target pixel values, the portion of the largest tap value which is dependent upon the next integration period is substantially equal to the difference between the required tap value and the portion which is independent of the integration period. Therefore FIG. 2b provides an example of exposure control apparatus to control an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern and having a respective phase relationship with the pulsed illumination of the illumination source, the exposure control apparatus comprising: a detector 250 configured to detect, for a selected tap value of a set of one or more target pixels, a portion of that tap value which is independent of the integration period and a portion which is dependent upon the integration period; and a controller 260 configured to select a next integration period for the image capture sensor so that for a next pixel integration of the set of one or more target pixel values, the portion of the largest tap value which is dependent upon the next integration period is substantially equal to the difference between the required tap value and the portion which is independent of the integration period.

These matters will be discussed below in more detail.

Figure 3:
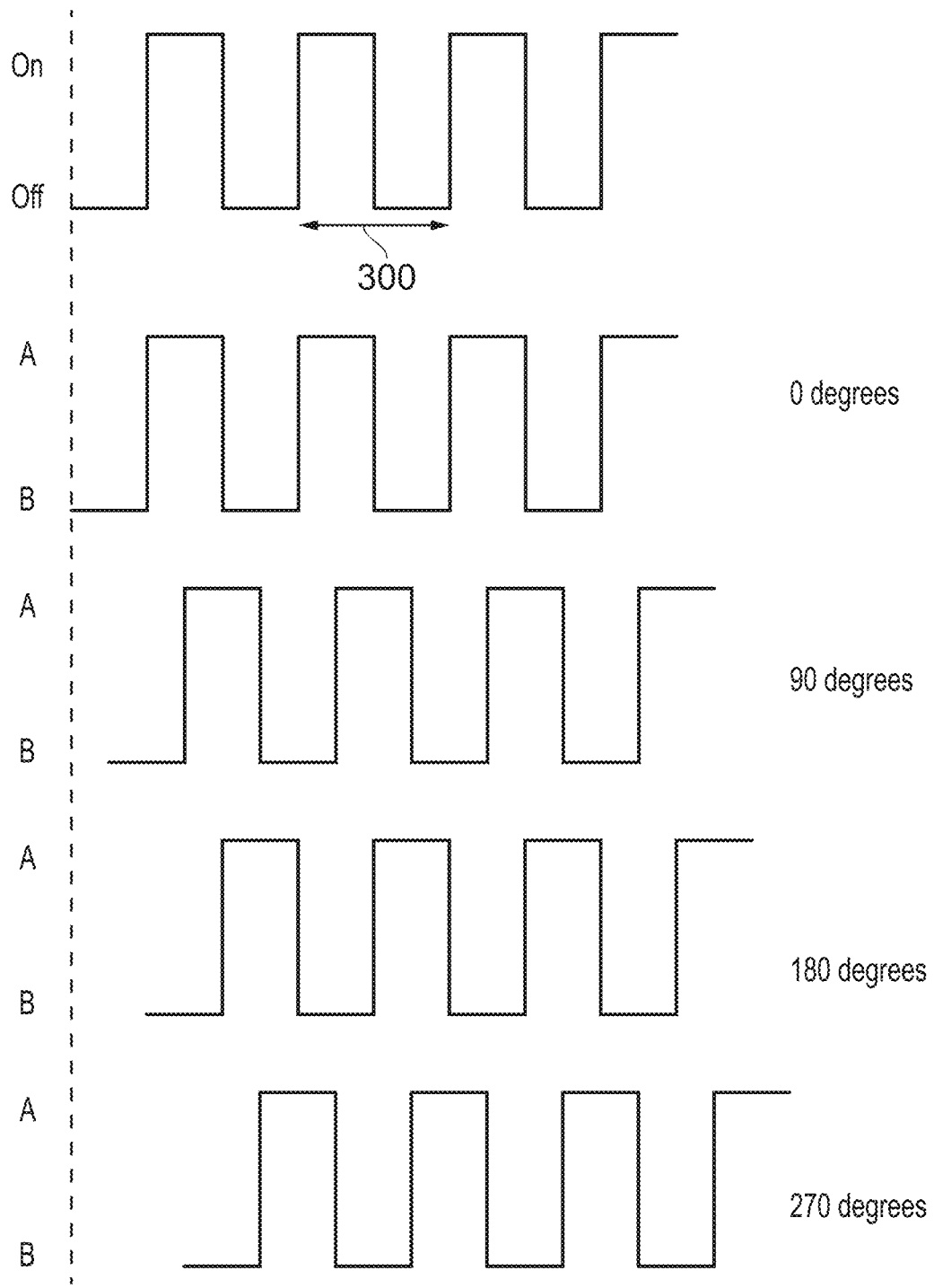
FIG. 3 schematically illustrates a set of capture timing relationships.

FIG. 3 schematically illustrates a set of capture timing relationships. In particular, a top row of FIG. 3 represents an example timing of the pulsed illumination 105, between an "off" state and an "on" state, at a pulse repetition frequency (such as 40 MHz) represented by the reciprocal of a pulse repetition period 300.

The generation of an image involves multiple instances of illumination and image sensing, each at a respective phase relationship between the illumination and the changing electric field between the taps A and B. Each instance lasts for the integration period, and the instances are separated by a guard period (for example equal to one half of the integration period). So, amongst such instances, multiple sets of samples of pixel outputs are derived, each at the same repetition frequency but at a different phase relationship relative to the illumination pulses. Four such examples are shown in FIG. 3, namely having a phase relationship of 0 degrees, 90 degrees, 180 degrees and 270 degrees respectively. The pulse pattern shown in each case relates to instances of the electric field generated by the electrodes 210 directing accumulated charges toward the tap A or toward the tap B. So, the electric field is repeatedly reversed at the same repetition rate as the pulsed illumination in this example.

Note that a different repetition rate (of the variations in electric field) could be used, for example twice the repetition rate or half the repetition rate of the illumination modulation. In general, light is sampled according to a pulsed sampling pattern (which may or may not be at the pulse repetition frequency of the modulated illumination) and having a respective phase relationship with the pulsed illumination of the illumination source. A phase relationship can be maintained in such examples even if the detection frequency is not the same as the illumination repetition frequency. However, in example embodiments, the two frequencies may be the same. Note also that the duty ratio (the ratio of "illumination on" to "illumination off" in an individual cycle) may be 50% or another value such as a value less than 50%.

Figure 4:
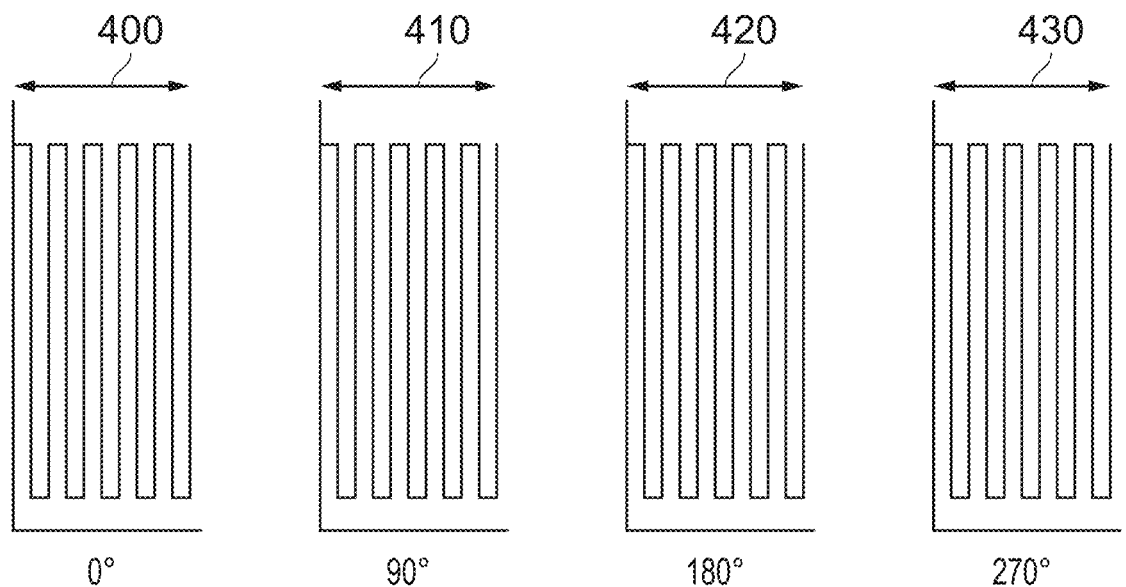
FIG. 4 schematically illustrates an integration period.

Referring to FIG. 4, and noting each of the second to fifth rows of FIG. 3 represents a respective phase difference, each instance of detection takes place over a period 400, 410, 420, 430 during which the illumination of the top row of FIG. 3 is provided and one of the respective detections (0 degrees, 90 degrees, 180 degrees and 270 degrees) takes place on a pulsed basis. The periods 400 . . . 430 are all the same and are referred to as the integration period. Note that although the example of FIG. 3 shows the instances using phase differences which increase in order from 0 degrees, the phase differences could be applied in a different order to the successive instances. Other arrangements could use different numbers of instances, for example six instances with phase differences separated by 60 degrees, or the like.

Depending on the particular phase relationship in use, and the particular distance of the object 115 from the sensor and illumination source 120, it may well be that more accumulated charges are detected during one half of a detection cycle than during another, which is to say that the output at one tap is different to the output at the other tap.

Figure 5:
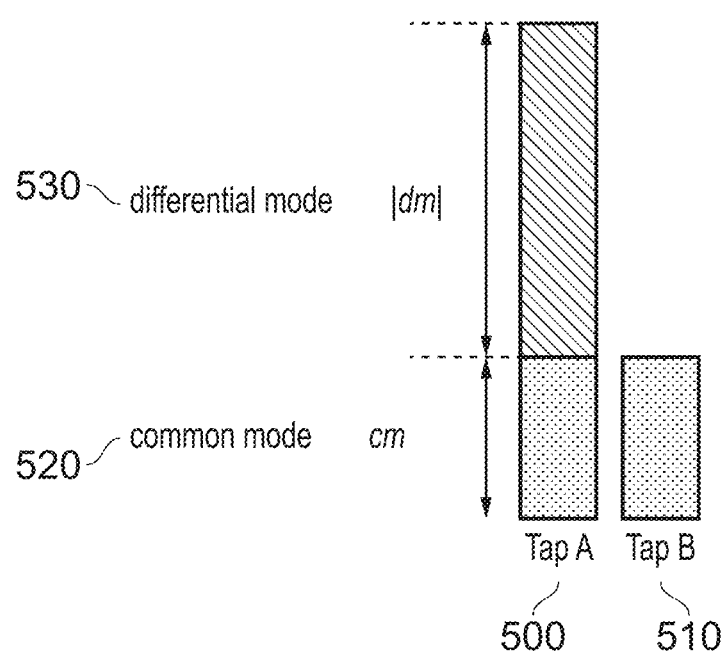
FIG. 5 schematically illustrates common mode and differential mode signals.

In FIG. 5, the quantities of charge detected at tap A and tap B are represented on a vertical scale, and it may be seen that in this example a greater quantity of charge is detected at tap A than tap B given a particular example of an object's distance and the phase relationship of the detection in use. Here, the part of the detection common to both of tap A and tap B is referred to as a common mode signal or component. That part which is not common to both tap A and tap B is referred to as a differential mode signal or component. So, for a pair of taps (A,B) in this example the common mode signal is the minimum of (tap A, tap B) and the differential mode signal is the maximum of (tap A, tap B) minus the common mode signal. So, FIG. 5 shows a pair of tap values 500, 510, a common mode component 520 and a differential mode component 530.

Figure 6A:
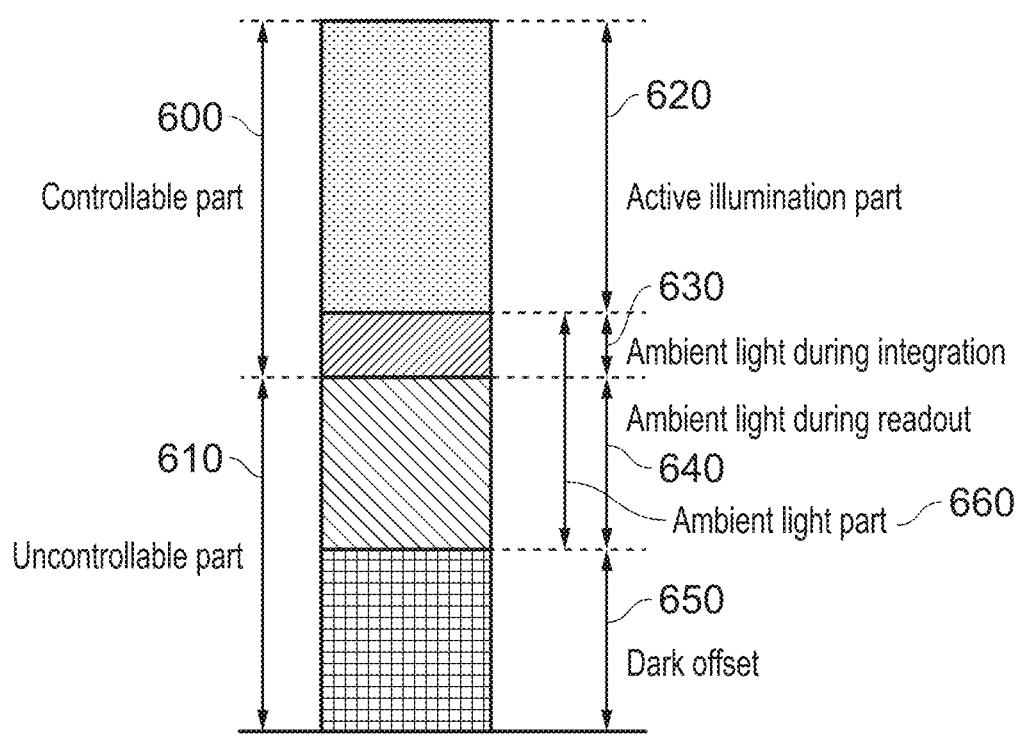
FIGS. 6a and 6b represent signal components without and with the use of a global shutter.

FIG. 6a represents signal components of, for example, the larger tap value of FIG. 5. Here, the signal components are arranged as a controllable part 600, being a portion of the tap value which is dependent upon the integration period, and an uncontrollable part 610 being a portion of the tap value which is independent of the integration period.

The controllable part 600 comprises an active illumination part 620, being a detection of the reflected illumination provided by the illumination source, and a part 630 representing ambient light during the integration period.

The uncontrollable part 610 comprises a part 640 representing ambient light during the read out process and a dark offset 650. The parts 630 and 640 together represent an ambient light part 660.

Figure 6B:
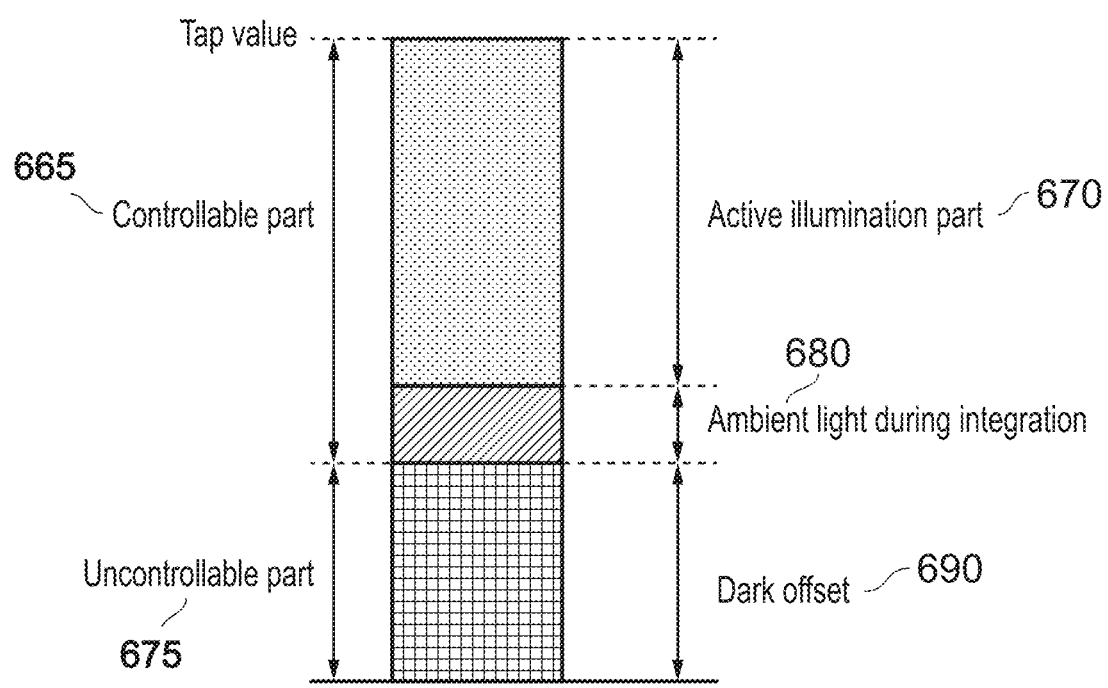

The example of FIG. 6a relates to an instance in which a so-called global shutter is not used to prevent light reaching the pixel elements during the read out process. For comparison, FIG. 6b schematically illustrates an arrangement in which a global shutter is used such that the "ambient light during read out" part 640 does not exist in FIG. 6b. Instead, the controllable part 665 comprises an active illumination part 670 and a part 680 relating to ambient light during integration. The uncontrollable part 675 simply relates to the dark offset 690.

It is noted that the control of the integration period is a potentially less difficult problem in the case of FIG. 6b, in that the uncontrollable part 690 can simply be obtained as the dark offset, which is the output of the subset 130 of blanked pixel elements. So, the situation in which a global shutter is not used is of more relevance to the present techniques, but the techniques described here can be used in the case that a global shutter is provided.

Figure 7:
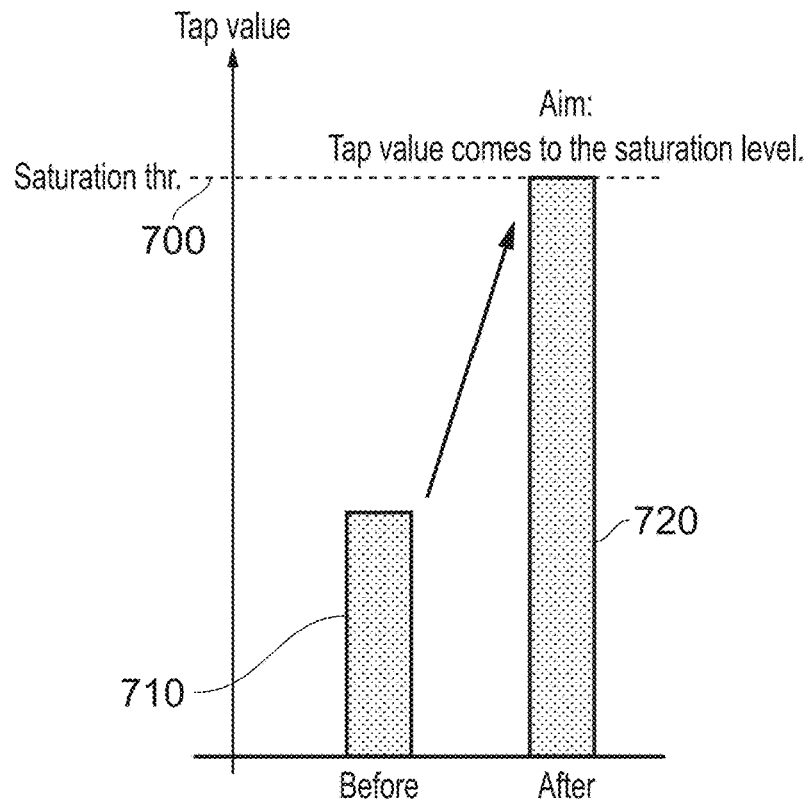
FIG. 7 schematically illustrates an auto-exposure process.
Figure 8:
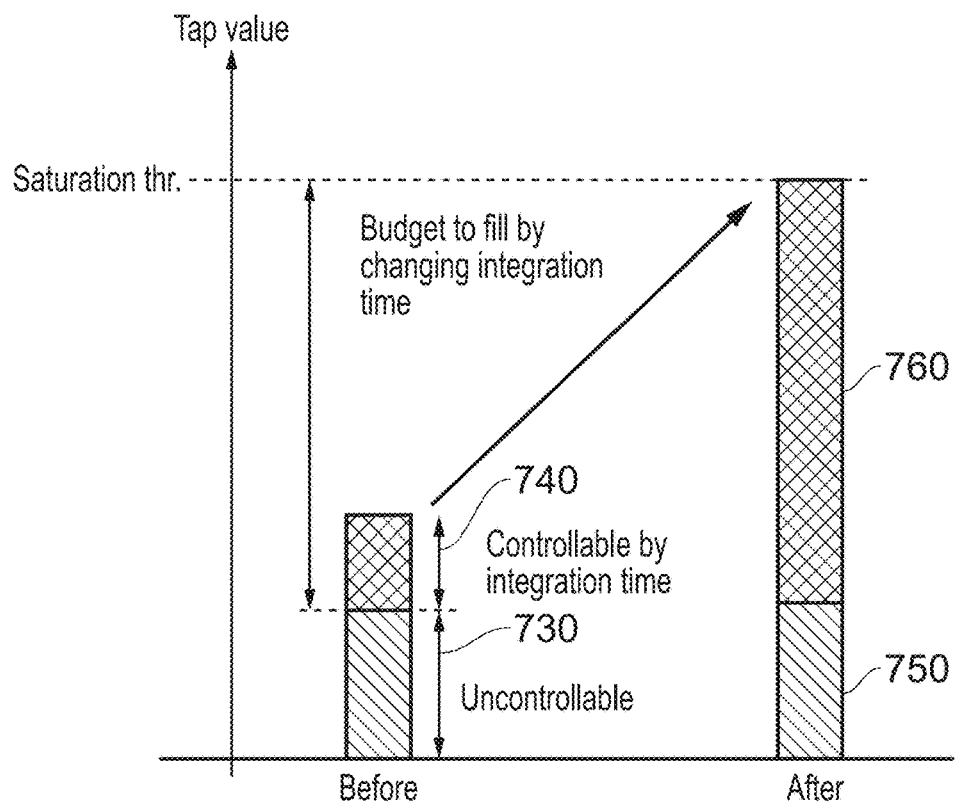
FIG. 8 schematically illustrates the process of FIG. 7 in more detail.

FIGS. 7 and 8 schematically illustrate an auto-exposure process. In both FIGS. 7 and 8, the vertical rectangles represent tap values on a vertical scale, and also shown on the vertical scale is a so-called saturation threshold 700, which is a maximum tap value providing meaningful information, because at this level the sensor is saturated such that an increase in light does not lead to a corresponding measurable increase in detected accumulated charge.

For an example tap value 710, the aim is that after exposure adjustment, the tap value reaches the saturation level 700 as an example 720 in which the required tap value is a saturation pixel value. This is considered to provide the best signal to noise ratio (SNR) without exceeding the saturation threshold 700. However, referring to FIG. 8, and the discussions above, it is noted once again that the tap values 710 is formed of an uncontrollable part 730 independent of exposure period or integration period and a part 740 controllable by integration time. It is assumed that the uncontrollable portion remains the same as a portion 750 after a change to the integration period, but that the change to integration period will affect the controllable portion 740 giving a larger controllable portion 760 in this example.

Before discussing an auto-exposure process to set the integration time in detail, a process to select one or more pixels to be used as the basis of such a process will now be described.

Figure 9:
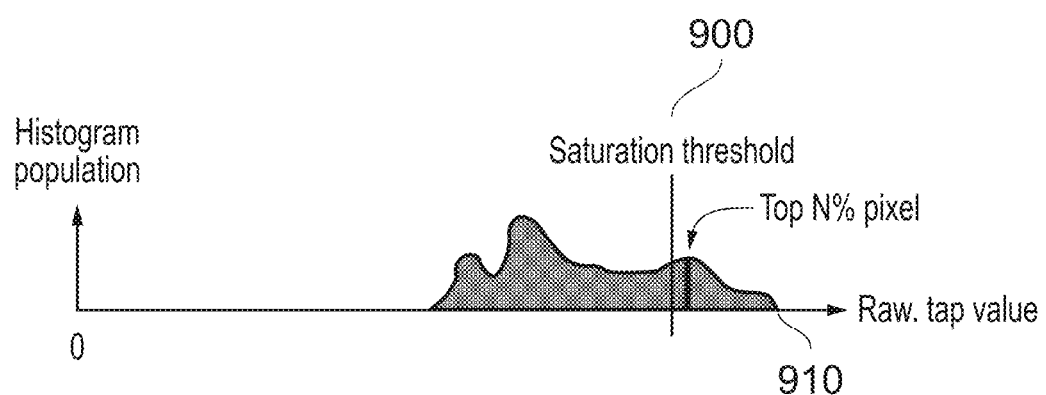
FIGS. 9 and 10 schematically illustrate a pixel selection process.

Within a region of interest of the captured image, which may be defined as a central area, or an area in which automatic focusing has been performed, or an area detected to contain an object of interest, a so-called histogram representation of the tap values is considered in FIG. 9, with tap value extending from a low or zero value to the left of FIG. 9 to a high value to the right of FIG. 9, passing the saturation threshold 900 along the way.

Within the distribution of tap values, a "top N % pixel" value is selected. This involves selecting a value which is N % below the highest value 910. For example, N may be 5, so that the top N % pixel is one having a highest tap value which is exactly 5% below the highest tap value 910 in this particular population. The processing may then be applied to change the exposure or integration period such that if the top N % pixel is already saturated (as it is shown in FIG. 9 by way of example) the integration period is decreased. The amount of decrease may be determined by the number of saturated pixels so that a larger decrease is applied in the case that the number of saturated pixels is larger.

Figure 10:
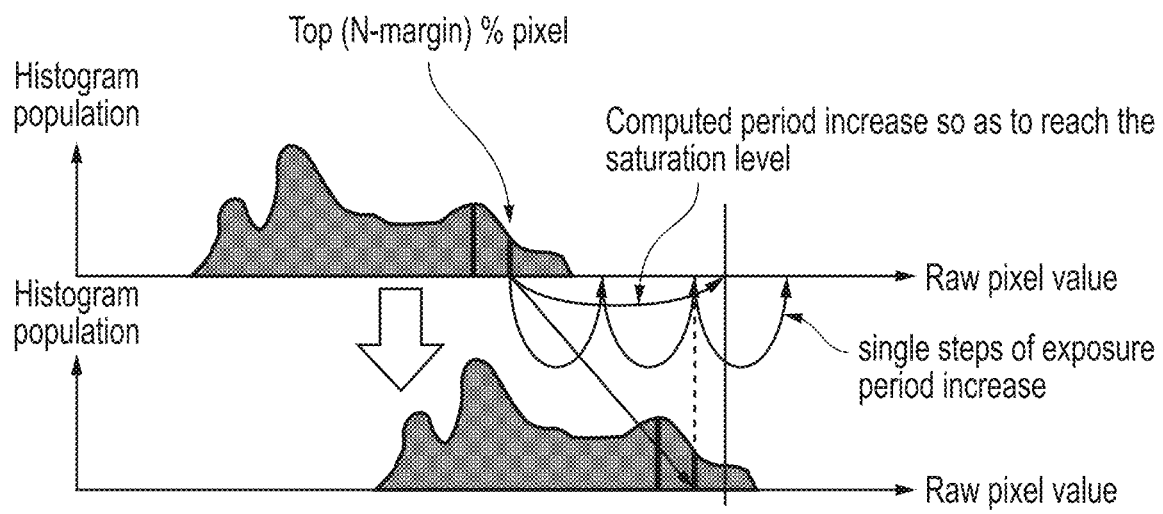

FIG. 10 schematically illustrates an increase in integration period, applicable in a situation in which the top N % pixel is not already saturated.

In the present example, the integration period may be continuously adjustable or may be adjustable by ten even steps each corresponding to one tenth of the maximum integration period of 100 µs.

In the upper portion of FIG. 10, the top N % pixel is well below the saturation level and so the exposure or integration period is increased so that the top N % pixel in the same population would reach the saturation level.

But because in at least some examples the integration period is increased step-wise in the present example, a step which leads to the top N % pixel not exceeding the saturation level (but for which the next stepped increase would lead to exceeding the saturation level) is selected. If the integration period is continuously adjustable then the integration period can be increased so that the top N % pixel is at the saturation level. The examples below will assume that the integration period is continuously adjustable.

Figure 11:
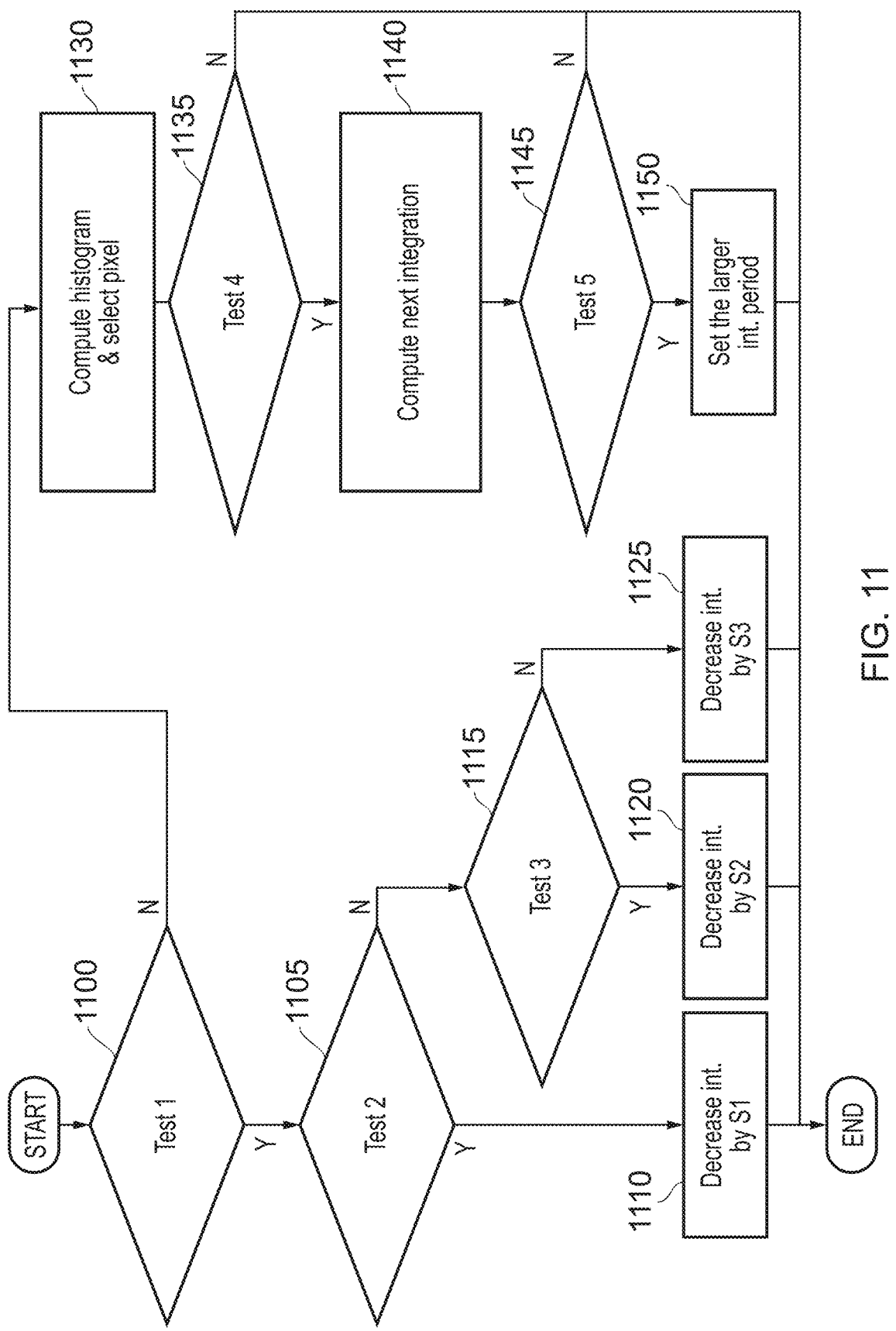
FIG. 11 is a schematic flowchart illustrating an auto-exposure process.

FIG. 11 is a schematic flow chart illustrating an auto-exposure process performed by the detector 250 and controller 260 of FIG. 2b.

At a step 1100, Test 1 is applied, which is to detect whether the number of saturated pixels (that is to say pixels for which more than one tap value is saturated) is greater than a threshold T1.

If the answer is "yes" then control passes to a step 1105, at which Test 2 is applied which is to detect whether the number of saturated pixels in the region of interest is less than a threshold T2.

If the answer is "yes" then at a step 1110 the integration period is decreased by an amount S1 (for example, 10% of the maximum integration time or 10% of the current integration time). If the answer at the step 1105 is "no" then control passes to a step 1115 at which Test 3 is applied, which is to detect whether the number of saturated pixels in the region of interest is less than a threshold T3.

If the answer at the step 1115 is "yes" then the integration period is decreased by an amount S2 (for example, 20% of the maximum integration time or 20% of the current integration time) at a step 1120 and if the answer is "no" then the integration period is decreased by an amount S3 (for example, 30% of the maximum integration time or 30% of the current integration time) at a step 1125.

The thresholds T1, T2, T3 may be, for example, 1.25%, 5% and 20% respectively of the total number of pixels in the image (the ratio is against the whole image so as to avoid a dependency of the process on the size of a region of interest). The process ends after any of the steps 1110, 1125.

The steps leading to the outcomes 1110, 1120, 1125 provide an example in which the controller is configured, when at least a threshold proportion of pixels in the region of interest of the captured image have at least the saturation pixel value, to select a next integration period of the image capture sensor which is decreased relative to a current integration period, and when fewer than a threshold proportion of pixels in at least a region of interest of the captured image have at least the saturation pixel value, to select a next integration period which is no lower than the current integration period. As discussed with regard to the different outcomes 1110, 1120, 1125, the controller may be configured to decrease the integration period by an amount dependent upon the number of pixels in the region of interest having at least the saturation pixel value.

Returning to the step 1100, if the outcome is "no" then control passes to a step 1130 at which a histogram representation of the maximum tap values of each pixel in the region of interest is considered, and a pixel having the top N % tap value (as discussed above with reference to FIGS. 9 and 10) is selected. The step 1130 therefore provides an example of selecting a set of one or more target pixels comprises one or more pixels having a selected tap value (such as the larger or largest of the tap values for that pixel) which is lower by a predetermined difference amount (for example N %) than a maximum tap value of all pixels in the region of interest of the captured image. As discussed, the predetermined difference amount may be a predetermined proportion such as N % of the maximum tap value.

At a step 1135, Test 4 is performed, which is to detect whether the maximum tap value of that pixel is smaller than the saturation threshold by no more than a margin amount such as 0.25% of the saturation threshold (in other words, is the tap value quite close to the saturation threshold). If the answer is "no" then the process ends, on the grounds that the tap value is already close to the saturation threshold and there is little to be gained by attempting to increase the integration period. This provides an example in which the controller is configured not to change the integration period when the one or more target pixels have a selected tap value (such as a largest tap value) which is within a predetermined threshold of the required tap value.

If however the answer to the Test 4 is "yes" then control passes to a step 1140 at which a next integration period is computed. In some examples, this can be performed for all pixels in the top N % of the histogram, with the minimum of the derived next integration periods being selected as a candidate for the next integration period. Alternatively, this calculation of the step 1140 can be carried out just for the pixel selected at the step 1140.

At a step 1145, a Test 5 is performed to detect whether the computed next integration period is larger than the current integration period. If the answer is no then the process ends. If the answer is yes then at a step 1150 the computed next integration period is applied.

The derivation of the next integration period at the step 1140 will now be described in detail.

Figure 12:
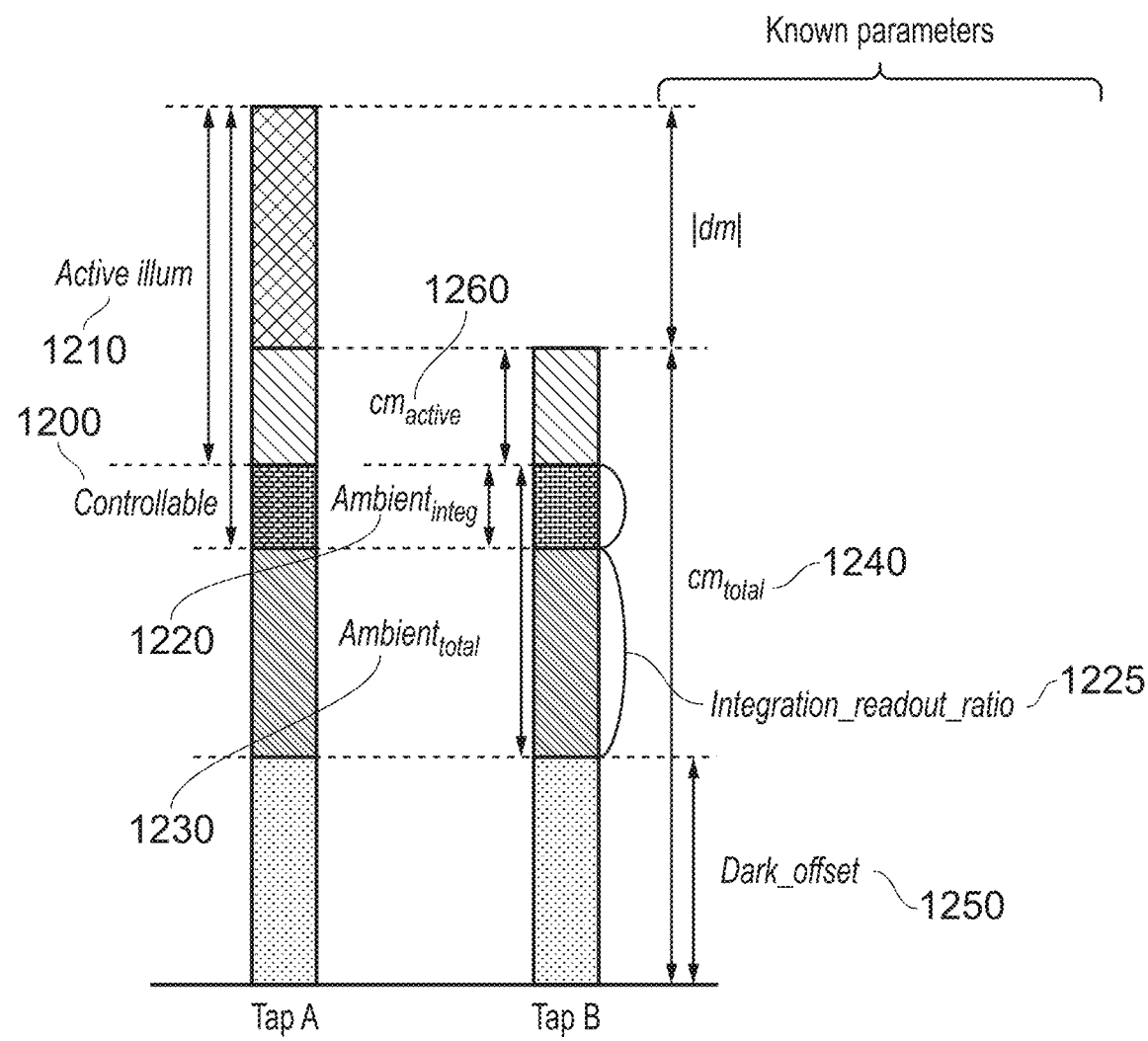
FIG. 12 schematically illustrates a set of signal components.

Referring to FIG. 12, the aim, as discussed above, is to compute Controllable 1200. The technique used in this example uses active_illum 1210 (the part relating to detection of the illumination provided by the illumination source) and Ambient$_{integ}$ 1220 (the part relating to ambient light during integration).

$$\text{Controllable} = \text{active\_illum} + \text{Ambient}_{integ}$$

To obtain Ambient$_{integ}$, the "integration readout ratio" 1225 is used, which relates the readout time ($T_{readout}$) and integration time ($T_{integ}$). Ambient$_{integ}$ is then computable from Ambient$_{total}$ 1230:

$$ambient_{integ} = \frac{T_{integ}}{T_{readout} + T_{integ}} \cdot ambient_{total}$$

This provides an example in which the detector is configured to detect an ambient light contribution to the portion which is dependent upon the integration period, in dependence upon:

a ratio of the integration period to a sum of the integration period and a readout period applicable to the selected (for example, largest) tap value; and a total common mode component, less the dark offset value, and less a common mode contribution resulting from the detection of the pulsed illumination.

As cm$_{total}$ 1240 and dark_offset 1250 are both known (cm$_{total}$ is the common mode component and dark_offset is known from the output of the blanked pixels 130) then if cm$_{active}$ 1260 is available, ambient$_{total}$ is computable as follows:

$$ambient_{total} = cm_{total} - cm_{active} - \text{dark\_offset}$$

So, the next part of the process is to obtain an estimate of cm$_{active}$.

Figure 13:
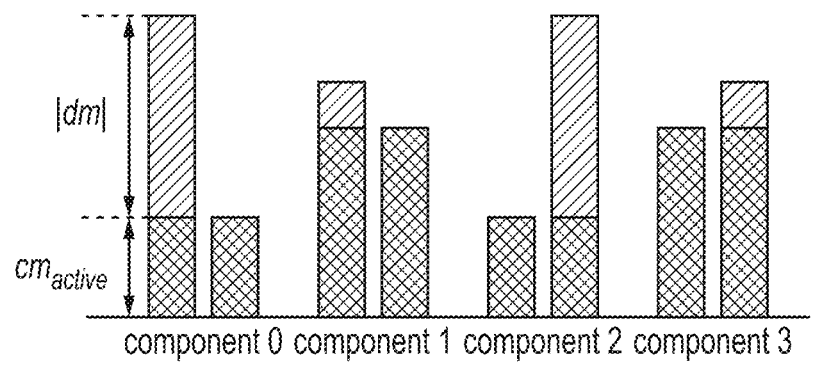
FIGS. 13 to 15 schematically illustrate the derivation of a contrast metric.

Referring to FIG. 13, cm$_{active}$ is obtained from the AC Contrast derived from the in-phase (I) and quadrature (Q) components of the detected signal as shown in FIG. 13. Note that when the scene is static, dm$_0$=−dm$_2$ and dm$_1$=−dm$_3$, then 2(|I|+|Q|)=2Σ|dm|. The AC Contrast is a property of the pixel elements and is pre-measured at a pixel characterization stage as a so-called demodulation contrast. So, the sum of cm$_{active}$ over all tap pairs can be written as a sum of |dm| with the pre-measured AC$_{contrast}$ applicable to the current modulation (pulse repetition) frequency fmod:

$$\sum cm_{active} = \frac{2 - AC_{contrast}}{2AC_{contrast}} \sum |dm|$$

$$= A_{(fmod)} \cdot \sum |dm|$$

where $$A_{(fmod)} = \frac{2 - AC_{contrast}}{2AC_{contrast}}.$$

This is a constant corresponding to fmod.

Figure 14:
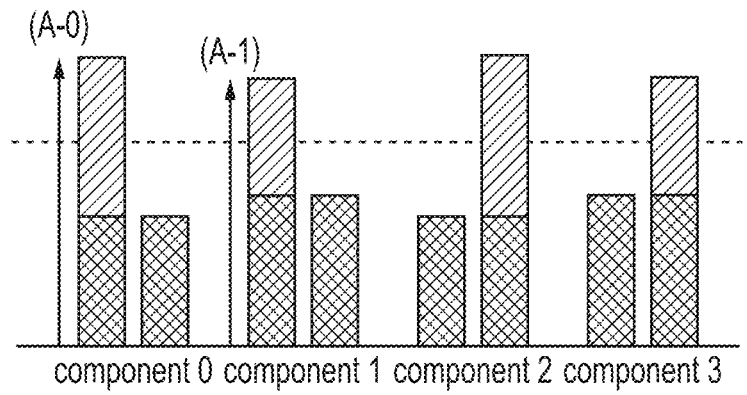
Figure 15:
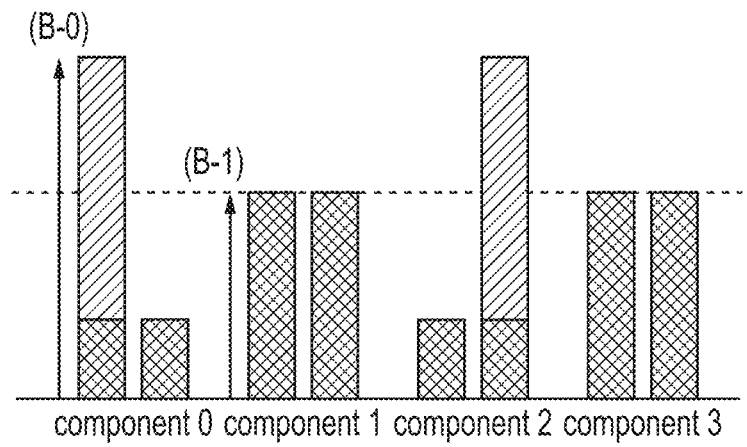

To compute active_ilium 1210, and referring to FIGS. 14 and 15, the question arises as to which tap values amongst a set corresponding to a pixel should be used. The answer in the present techniques is to use the largest tap value B-0 in FIG. 15 for the auto-exposure process.

This provides an example in which the detector is configured to detect the common mode contribution resulting from the detection of the pulsed illumination as a function of a contrast property of the image capture sensor and a sum of differential mode components for the pixel having the largest tap value.

To summarize the process discussed above, the detector is configure to detect the portion dependent upon the integration period as a sum of the differential mode component, the common mode contribution resulting from the detection of the pulsed illumination and the ambient light contribution to the portion which is dependent upon the integration period. The derivation of the next integration period at the step 1140 is as follows:

$$\text{Controllable} = \text{active\_illum} + \text{Ambient}_{integ}$$

$$= \frac{3\sum|dm| + 2\sum cm_{active}}{2n} + \text{i\_ir} \cdot$$

$$\frac{\sum cm_{total} - \sum cm_{active} - \text{dark\_offset}}{n}$$

$$= \frac{(1.5 + \text{r\_ir} \cdot A_{(fmod)})\sum|dm| + \text{i\_ir} \cdot \sum cm_{total}}{n} -$$

$$\text{i\_ir} \cdot \text{dark\_offset}$$

where:

$$\begin{cases} \text{i\_ir} = \dfrac{\text{integration}}{\text{integration} + \text{readout} \cdot \dfrac{y}{\text{height}}} \\ \text{r\_ir} = \dfrac{\text{readout} \cdot \dfrac{y}{\text{height}}}{\text{integration} + \text{readout} \cdot \dfrac{y}{\text{height}}} \end{cases}$$

target gap = gap between current tap value and saturation level $$= \text{dm\_range} - ambient_{readout}$$

$$= \text{dm\_range} - \text{r\_ir} \cdot \frac{\sum cm_{total} \sum cm_{active} - \text{dark\_offset}}{n}$$

$$= \text{r\_ir} \cdot \left( \frac{A_{(fmod)} \cdot \sum|dm| - \sum cm_{total}}{n} + \text{dark\_offset} \right) +$$

$$\text{dm\_range}$$

$$\text{next\_integration\_step} = \text{floor}\left( \frac{\text{target\_gap}}{\text{controllable}} \cdot \text{current\_integration\_step} \right)$$

Figure 16:
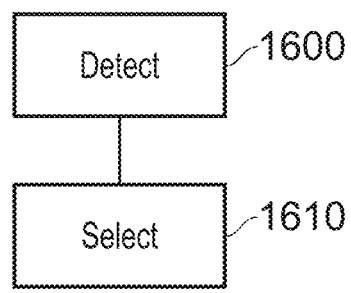
FIG. 16 is a schematic flowchart illustrating a method.

FIG. 16 is a schematic flowchart illustrating a method of controlling an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern and having a respective phase relationship with the pulsed illumination of the illumination source, the method comprising:

detecting (at a step 1600), for a selected tap value of a set of one or more target pixels, a portion of that tap value which is independent of the integration period and a portion which is dependent upon the integration period; and selecting (at a step 1610) a next integration period for the image capture sensor so that for a next pixel integration of the set of one or more target pixel values, the portion of the selected tap value which is dependent upon the increased integration period is substantially equal to the difference between the required tap value and the portion which is independent of integration period.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Respective aspects and features of embodiments of the present disclosure are defined by the following numbered clauses:

1. Exposure control apparatus to control an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern having a respective phase relationship with the pulsed illumination of the illumination source, the exposure control apparatus comprising:
   a detector configured to detect, for a selected tap value of a set of one or more target pixels, a portion of that tap value which is independent of the integration period and a portion which is dependent upon the integration period; and
   a controller configured to select a next integration period for the image capture sensor so that for a next pixel integration of the set of one or more target pixel values, the portion of the largest tap value which is dependent upon the next integration period is substantially equal to the difference between the required tap value and the portion which is independent of the integration period.
2. Apparatus according to clause 1, in which the required tap value is a saturation pixel value.
3. Apparatus according to clause 2, in which the controller is configured, when at least a threshold proportion of pixels in the region of interest of the captured image have at least the saturation pixel value, to select a next integration period of the image capture sensor which is decreased relative to a current integration period, and when fewer than a threshold proportion of pixels in at least a region of interest of the captured image have at least the saturation pixel value, to select a next integration period which is no lower than the current integration period.
4. Apparatus according to clause 3, in which the controller is configured to decrease the integration period by an amount dependent upon the number of pixels in the region of interest having at least the saturation pixel value.
5. Apparatus according to any one of the preceding clauses, in which the set of one or more target pixels comprises one or more pixels having a largest tap value which is lower by a predetermined difference amount than a maximum tap value of all pixels in the region of interest of the captured image.
6. Apparatus according to clause 5, in which the predetermined difference amount is a predetermined proportion of the maximum tap value.
7. Apparatus according to any one of the preceding clauses, in which the detector is configured to detect a dark offset value as at least a part of the portion independent of the integration period, by detecting the output of one or more pixels of the image capture sensor shielded from incident light.
8. Apparatus according to clause 7, in which:
   each pair of tap values has a common mode component and a differential mode component; and
   the detector is configured to detect an ambient light contribution to the portion which is dependent upon the integration period, in dependence upon:
   a ratio of the integration period to a sum of the integration period and a readout period applicable to the selected tap value; and
   a total common mode component, less the dark offset value, and less a common mode contribution resulting from the detection of the pulsed illumination.
9. Apparatus according to clause 8, in which the detector is configured to detect the common mode contribution resulting from the detection of the pulsed illumination as a function of a contrast property of the image capture sensor and a sum of differential mode components for the pixel having the selected tap value.
10 Apparatus according to clause 9, in which the detector is configure to detect the portion dependent upon the integration period as a sum of the differential mode component, the common mode contribution resulting from the detection of the pulsed illumination and the ambient light contribution to the portion which is dependent upon the integration period.
11. Apparatus according to clause 5, in which the controller is configured not to change the integration period when the one or more target pixels have a selected tap value which is within a predetermined threshold of the required tap value.
12. Apparatus according to any one of the preceding clauses, in which:
   the selected tap value is a largest tap value and/or
   the pulsed sampling pattern is at the pulse repetition frequency.
13. Image sensing apparatus comprising:
   a time-of-flight image capture sensor; and
   exposure control apparatus according to any one of the preceding clauses, configured to control an integration period of the image capture sensor.
14. A method of controlling an integration period of a time-of-flight image capture sensor comprising an illumination source providing pulsed illumination at a pulse repetition frequency, in which each pixel of an array of pixels is represented by multiple pairs of tap values, each pair of tap values being indicative of light sampled according to a pulsed sampling pattern having a respective phase relationship with the pulsed illumination of the illumination source, the method comprising:
   detecting, for a selected tap value of a set of one or more target pixels, a portion of that tap value which is independent of the integration period and a portion which is dependent upon the integration period; and
   selecting a next integration period for the image capture sensor so that for a next pixel integration of the set of one or more target pixel values, the portion of the largest tap value which is dependent upon the increased integration period is substantially equal to the difference between the required tap value and the portion which is independent of integration period.
15. Computer software which, when executed by a computer, causes the computer to perform the method of clause 14.
16. A machine-readable non-transitory storage medium which stores computer software according to clause 15.

The invention claimed is:

1. An exposure control apparatus to control an integration period of a time-of-flight image capture sensor, the time-of-flight image capture sensor comprising:
an illumination source configured to provide pulsed illumination at a pulse repetition frequency;
an array of pixels, wherein each pixel, in the array of pixels, includes a first tap configured to collect accumulated charges when a first electric field is applied to the pixel, and a second tap configured to collect the accumulated charges when a second electric field is applied to the pixel, wherein the second electric field is oriented in a different direction than the first electric field, wherein the first tap and the second tap are configured to produce tap values that are indicative of light sampled according to a pulsed sampling pattern having a respective phase relationship with the pulsed illumination of the illumination source, the exposure control apparatus comprising:
a detector configured to detect, from a set of one or more target pixels, a selected tap value, and the detector being further configured to determine, based on a first tap value and a second tap value for each pixel in the set of one or more pixels, a portion of the selected tap value which is independent of the integration period and a portion of the selected tap value which is dependent upon the integration period; and
a controller configured to select a next integration period for the image capture sensor so that for a next pixel integration of the set of one or more target pixel values, the portion of the largest tap value which is dependent upon the next integration period is substantially equal to the difference between a required tap value and the portion which is independent of the integration period.

2. The apparatus according to claim 1, wherein the required tap value is a saturation pixel value.

3. The apparatus according to claim 2, wherein the controller is configured, when at least a threshold proportion of pixels in the region of interest of the captured image have at least the saturation pixel value, to select the next integration period of the image capture sensor which is less than a current integration period, and when fewer than the threshold proportion of pixels in at least a region of interest of the captured image have at least the saturation pixel value, to select the next integration period which is greater than or equal to the current integration period.

4. The apparatus according to claim 3, wherein the controller is configured to decrease the integration period by an amount dependent upon the number of pixels in the region of interest having at least the saturation pixel value.

5. The apparatus according to claim 1, wherein the set of one or more target pixels comprises one or more pixels having a largest tap value which is lower by a predetermined difference amount than a maximum tap value of all pixels in the region of interest of the captured image.

6. The apparatus according to claim 5, wherein the predetermined difference amount is a predetermined proportion of the maximum tap value.

7. The apparatus according to claim 5, wherein the controller is configured not to change the integration period when the one or more target pixels have a selected tap value which is within a predetermined threshold of the required tap value.

8. The apparatus according to claim 1, wherein the detector is configured to detect a dark offset value as at least a part of the portion independent of the integration period, by detecting the output of one or more pixels of the image capture sensor shielded from incident light.

9. The apparatus according to claim 8, wherein:
each pair of tap values has a common mode component and a differential mode component; and
the detector is configured to detect an ambient light contribution to the portion which is dependent upon the integration period, in dependence upon:
a ratio of the integration period to a sum of the integration period and a readout period applicable to the selected tap value; and
a total common mode component, less the dark offset value, and less a common mode contribution resulting from the detection of the pulsed illumination.

10. The apparatus according to claim 9, wherein the detector is configured to detect the common mode contribution resulting from the detection of the pulsed illumination as a function of a contrast property of the image capture sensor and a sum of differential mode components for the pixel having the selected tap value.

11. The apparatus according to claim 10, wherein the detector is configure to detect the portion dependent upon the integration period as a sum of the differential mode component, the common mode contribution resulting from the detection of the pulsed illumination and the ambient light contribution to the portion which is dependent upon the integration period.

12. The apparatus according to claim 1, wherein:
the selected tap value is a largest tap value and/or
the pulsed sampling pattern is at the pulse repetition frequency.

13. An imaging sensing system comprising:
an illumination source configured to provide pulsed illumination at a pulse repetition frequency;
an array of pixels, wherein each pixel, in the array of pixels, includes a first tap configured to collect accumulated charges when a first electric field is applied to the pixel, and a second tap configured to collect the accumulated charges when a second electric field is applied to the pixel, wherein the second electric field is oriented in a different direction than the first electric field, wherein the first tap and the second tap are configured to produce tap values that are indicative of light sampled according to a pulsed sampling pattern having a respective phase relationship with the pulsed illumination of the illumination source;
a detector configured to detect, from a set of one or more target pixels, a selected tap value, and the detector being further configured to determine, based on a first tap value and a second tap value for each pixel in the set of one or more pixels, a portion of the selected tap value which is independent of an integration period and a portion of the selected tap value which is dependent upon the integration period; and
a controller configured to select a next integration period for the image capture sensor so that for a next pixel integration of the set of one or more target pixel values, the portion of the largest tap value which is dependent upon the next integration period is substantially equal to the difference between a required tap value and the portion which is independent of the integration period.

14. A method of controlling an integration period of a time-of-flight image capture sensor, the time-of-flight capture sensor comprising:
an illumination source configured to provide pulsed illumination at a pulse repetition frequency;

an array of pixels, wherein each pixel, in the array of pixels, includes a first tap configured to collect accumulated charges when a first electric field is applied to the pixel, and a second tap configured to collect the accumulated charges when a second electric field is applied to the pixel, wherein the second electric field is oriented in a different direction than the first electric field, wherein the first tap and the second tap are configured to produce tap values that are indicative of light sampled according to a pulsed sampling pattern having a respective phase relationship with the pulsed illumination of the illumination source, the method comprising:

detecting, from a set of one or more target pixels, a selected tap value, and determining, based on a first tap value and a second tap value for each pixel in the set of one or more pixels, a portion of the selected tap value which is independent of the integration period and a portion of the selected tap value which is dependent upon the integration period; and selecting a next integration period for the image capture sensor so that for a next pixel integration of the set of one or more target pixel values, the portion of the largest tap value which is dependent upon the increased integration period is substantially equal to the difference between a required tap value and the portion which is independent of integration period.

* * * * *